United States Patent
Chittick et al.

(10) Patent No.: US 11,834,176 B2
(45) Date of Patent: Dec. 5, 2023

(54) BLENDED WING BODY AIRCRAFT

(71) Applicant: BOMBARDIER INC., Dorval (CA)

(72) Inventors: Ian Chittick, Saint-Laurent (CA);
Mark Rakowitz, Baie-d'Urfe (CA);
Thomas Reist, Barrie (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/448,111

(22) Filed: Jun. 21, 2019

(65) Prior Publication Data

US 2019/0389581 A1  Dec. 26, 2019

Related U.S. Application Data

(60) Provisional application No. 62/688,909, filed on Jun. 22, 2018.

(51) Int. Cl.
| | |
|---|---|
| *B64C 39/10* | (2006.01) |
| *B64C 1/00* | (2006.01) |
| *B64C 3/14* | (2006.01) |
| *B64C 25/32* | (2006.01) |

(52) U.S. Cl.
CPC ............ *B64C 39/10* (2013.01); *B64C 1/0009* (2013.01); *B64C 3/14* (2013.01); *B64C 25/32* (2013.01); *B64C 2039/105* (2013.01)

(58) Field of Classification Search
CPC ... B64C 39/12; B64C 39/10; B64C 2039/105; B64C 1/0009; B64C 3/14; B64C 25/32
See application file for complete search history.

(56) References Cited

U.S. PATENT DOCUMENTS

| | | | | |
|---|---|---|---|---|
| 6,382,562 | B1 * | 5/2002 | Whitlock ................ | B64C 3/00 244/129.5 |
| 6,578,798 | B1 * | 6/2003 | Dizdarevic ........... | B64C 23/069 244/35 R |
| 7,854,409 | B2 * | 12/2010 | Dizdarevic ............... | B64C 3/10 244/36 |
| 8,056,852 | B1 * | 11/2011 | Dizdarevic ............... | B64C 5/02 244/45 R |
| 2004/0217234 | A1 * | 11/2004 | Jones .................... | A61M 21/02 244/118.5 |

(Continued)

FOREIGN PATENT DOCUMENTS

| | | |
|---|---|---|
| GB | 2428414 A | 1/2007 |
| WO | 20070117260 A2 | 10/2007 |

OTHER PUBLICATIONS

European Patent Office, Extended European Search Report for European Patent Application No. 19181238.7, dated Nov. 14, 2019.
R.H. Liebeck, Blended Wing Body X-48B Flight Test, Boeing Research & Technology, Apr. 2015, retrieved from the Internet: URL:http:f/129.171.203.12/cms/file/liebeck.pdf, retrieved on Oct. 22, 2019.

(Continued)

*Primary Examiner* — Tye William Abell
(74) *Attorney, Agent, or Firm* — Norton Rose Fulbright Canada LLP

(57) ABSTRACT

There is disclosed a blended wing body aircraft including a center body having a lower side and an upper side opposed to the lower side. The center body has a central chord extending from a leading edge to a trailing edge of the center body. The lower side has a lowest point located between a first location forward of a pivot point about which the aircraft rotates during take-off and a second location aft of the pivot point. The first location is at a first distance corresponding to about 10% of a length of the central chord forward of the pivot point.

12 Claims, 4 Drawing Sheets

(56) References Cited

U.S. PATENT DOCUMENTS

| | | | | |
|---|---|---|---|---|
| 2007/0023571 A1* | 2/2007 | Kawai | ................. | F02K 1/48 244/119 |
| 2007/0145185 A1* | 6/2007 | Clark | ................. | B64C 25/001 244/100 R |
| 2008/0017753 A1* | 1/2008 | Clark | ................. | B64C 25/50 244/50 |
| 2010/0163670 A1* | 7/2010 | Dizdarevic | ......... | B64C 39/12 244/36 |
| 2014/0319274 A1* | 10/2014 | Lieven | ............. | B64D 11/00 244/118.5 |
| 2015/0375862 A1* | 12/2015 | Dornwald | ........... | B64D 27/14 244/102 R |
| 2016/0009391 A1* | 1/2016 | Friesel | ............. | B64C 39/10 244/36 |
| 2018/0001999 A1* | 1/2018 | Page | ................. | B64C 25/14 |

OTHER PUBLICATIONS

R.H. Liebeck, Blended Wing Body Subsonic Transport Then, Now and Beyond, ICAS2006, Sep. 2006, retrieved from the Internet: URL:https:jjwww.icas.orgjmediajpdf/ICAS%20Congress%20General%20Lecturesj2006/ICAS2006%20GL%20Liebeck.pdf, retrieved on Oct. 22, 2019.

Randhir Brar, Design of a Blended Wing Body Aircraft, Dec. 2014, retrieved from the Internet: URL:http://www.sjsu.edujaejprogramsjmsaejproject thesis/2014/Brar.Randhir%202Nov14.pdf, retrieved on Oct. 22, 2019.

Thomas A. Reist et al., Multifidelity Optimization of Hybrid Wing-Body Aircraft with Stability and Control Requirements, Journal of Aircraft, Mar.-Apr. 2019, pp. 442-456, vol. 56, No. 2, Canada.

\* cited by examiner

BLENDED WING BODY AIRCRAFT

TECHNICAL FIELD

The application relates generally to aircraft and more particularly to a blended wing body aircraft.

BACKGROUND OF THE ART

A Blended-Wing-Body (BWB) aircraft is an aircraft having an airfoil-shaped center body that is able to generate lift. This is different than a conventional aircraft in which the fuselage, typically of a cylindrical shape, generates very little lift. Some BWB aircraft can have less effective pitching moment controls because such aircraft often have a shorter lever arm from the control surface to a center of gravity than a conventional tailed airplane. Hence, as compared to conventional aircraft, more force is required to obtain an equivalent change in pitch. Existing solutions to overcome this problem can induce a penalty in drag, weight, and/or system complexity and, in some cases, can reduce the aircraft lift. Hence, there is room for improvements.

SUMMARY

In one aspect, there is provided a blended wing body aircraft comprising an airfoil-shaped center body having a lower side and an upper side opposed to the lower side, the center body having a central chord extending from a leading edge of the center body to a trailing edge of the center body, the lower side of the center body having a lowest point located between a first location forward of a pivot point about which the aircraft rotates during take-off and a second location aft of the pivot point, the first location being at a first distance corresponding to about 10% of a length of the central chord forward of the pivot point.

In another aspect, there is provided a blended wing body aircraft comprising: an airfoil-shaped center body having a lower side and an upper side opposed to the lower side, the center body having a central chord extending from a leading edge of the center body to a trailing edge of the center body; and a nose landing gear and a main landing gear for supporting the aircraft on a ground, the main landing gear being located aft of the nose landing gear relative to the central chord, the main landing gear defining a pivot point about which the aircraft rotates during take-off, wherein the lowest point is located between a first location forward of the pivot point and a second location aft of the pivot point, the first location being at a first distance corresponding to about 10% of a length of the central chord forward of the pivot point.

In various aspects, the pivot point may be representative of an axial location of a contact point between the aircraft and a ground.

The pivot point may be representative of an axial location of a contact point between a main landing gear of the aircraft and a ground.

The pivot point may be representative of a location of a main landing gear of the aircraft.

The second location may be at a second distance corresponding to about 5% of the length of the central chord aft of the pivot point.

The lowest point may be located aft of the pivot point.

The lowest point may be located within a distance corresponding to about 3% of the length of the central chord aft of the pivot point.

The lowest point may be located within a distance corresponding to about 5% of the length of the central chord aft of the pivot point.

The lowest point may be located within a distance corresponding to about 6% of the length of the central chord aft of the pivot point.

The lowest point may be located within a distance corresponding to about 8% of the length of the central chord aft of the pivot point.

The lowest point may be located within a distance corresponding to about 10% of the length of the central chord aft of the pivot point.

The lowest point may be located within a distance corresponding to about 15% of the length of the central chord aft of the pivot point.

The lowest point may be located forward of the pivot point.

The lowest point may be located within a distance corresponding to about 8% of the length of the central chord forward of the pivot point.

The lowest point may be located within a distance corresponding to about 6% of the length of the central chord forward of the pivot point.

The lowest point may be located within a distance corresponding to about 4% of the length of the central chord forward of the pivot point.

The lowest point may be located within a distance corresponding to about 2% of the length of the central chord forward of the pivot point.

The lowest point may be located within a distance corresponding to about 3% of the length of the central chord aft of the pivot point.

The pivot point may have an axial location that is between 50% and 75% of the length of the central chord from the leading edge of the center body.

Embodiments can include combinations of the above features.

Further details of these and other aspects of the subject matter of this application will be apparent from the detailed description included below and the drawings.

DESCRIPTION OF THE DRAWINGS

For a better understanding of the present invention, as well as other aspects and further features thereof, reference is made to the following description which is to be used in conjunction with the accompanying drawings, where.

Figure 1:
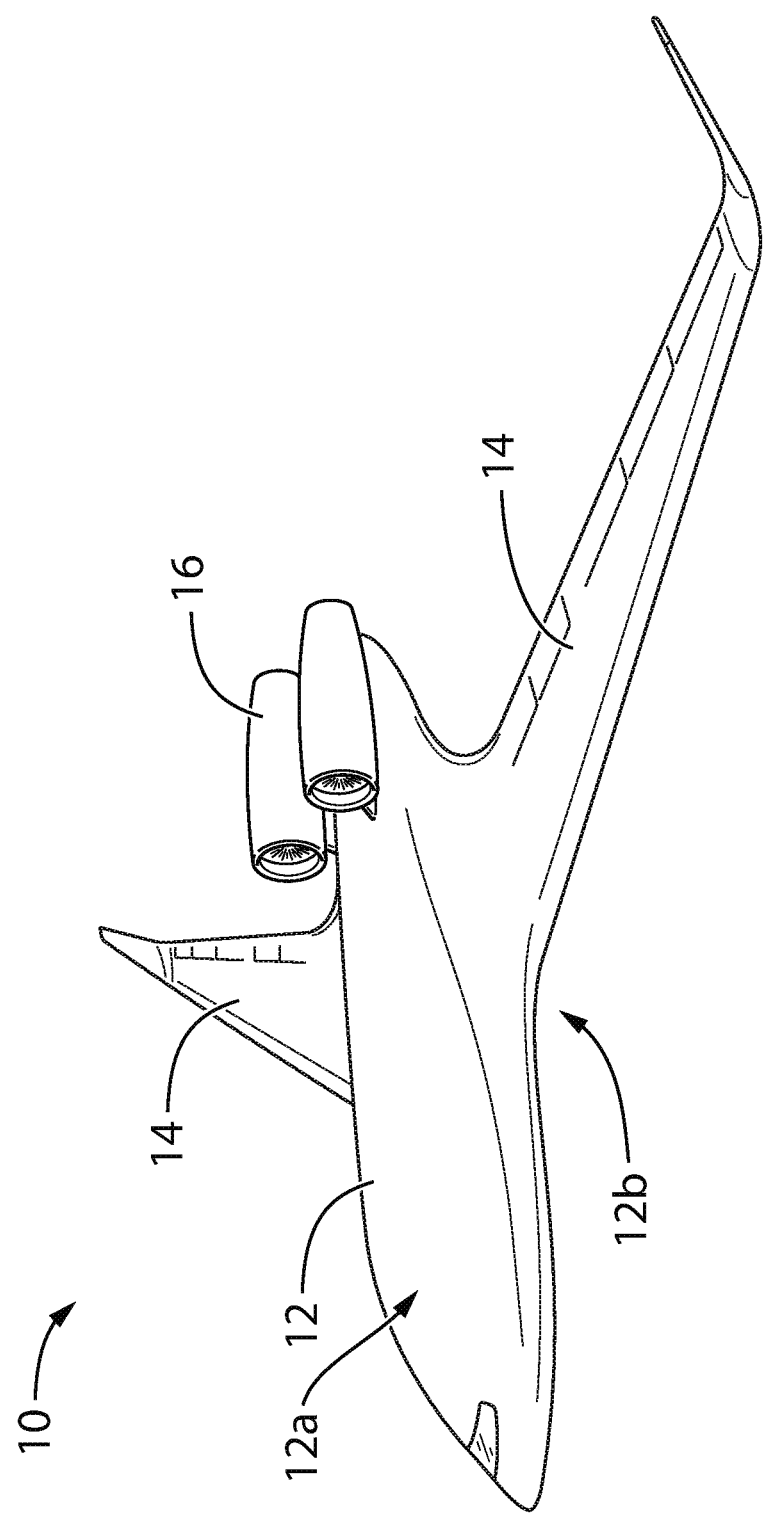
FIG. 1 is a schematic isometric view of a blended wing aircraft according to a particular embodiment.

In the drawings, embodiments of the invention are illustrated by way of example. It is to be expressly understood that the description and drawings are only for purposes of illustration and as an aid to understanding. They are not intended to be a definition of the limits of the invention.

DETAILED DESCRIPTION

Blended wing body aircraft designs are sometimes also referred to as "hybrid wing body" aircraft designs. In the present specification, including claims, it is understood that the term "blended wing body" encompasses aircraft designs which are sometimes referred to as "hybrid wing body" or "non-discontinuous chord" aircraft designs. A non-discontinuous chord aircraft is an aircraft in which a variation of chord lengths of a plurality of span-wise sections is substantially smooth in a span-wise direction, from a symmetry plane to tips of wings. Such aircraft are typically also characterized by a smooth variation of thicknesses of the span-wise sections from the symmetry plane to the tips of the wings.

Referring to the drawings and more particularly to FIG. 1, an exemplary blended wing body aircraft is shown at 10. The aircraft 10 has a center body 12, which may have lift-generating characteristics. The center body 12 has a fore end and an opposed aft end. The center body 12 may be airfoil-shaped or otherwise shaped to generate at least some lift. In some embodiments, the center body 12 may be configured to generate about 10% of the total lift generated by the aircraft 10 during at least one phase of operation (e.g., flight) of the aircraft 10. In some embodiments, the center body 12 may be configured to generate more than 10% of the total lift generated by the aircraft 10 during at least one phase of operation (e.g., flight) of the aircraft 10. In some embodiments, the center body 12 may be configured to generate about 15% of the total lift generated by the aircraft 10 during at least one phase of operation (e.g., flight) of the aircraft 10. In some embodiments, the center body 12 may be configured to generate between 15% and 20% of the total lift generated by the aircraft 10 during at least one phase of operation (e.g., flight) of the aircraft 10.

In the embodiment shown, the aircraft 10 is tailless; alternatively, a tail structure may be provided at the aft end of the center body 12 and/or a canard may be provided at or near the fore end of the center body 12. Wings 14 project laterally from opposite sides of the center body 12. The aircraft 10 has engines 16 mounted to the aft end of the center body 12; alternatively, the engines 16 could be mounted on the wings 14 or they could be fully or partially embedded within the center body 12 or the wings 14. The aircraft 10 is shown as a jet-engine aircraft, but may also be a propeller aircraft. The aircraft has a symmetry plane dividing the center body in two halves in the spanwise direction. Each of the wings 14 is located on a respective side of the symmetry plane. The aircraft 10 can have an interior configured for receiving a payload, such as passengers and/or cargo.

Figure 2:
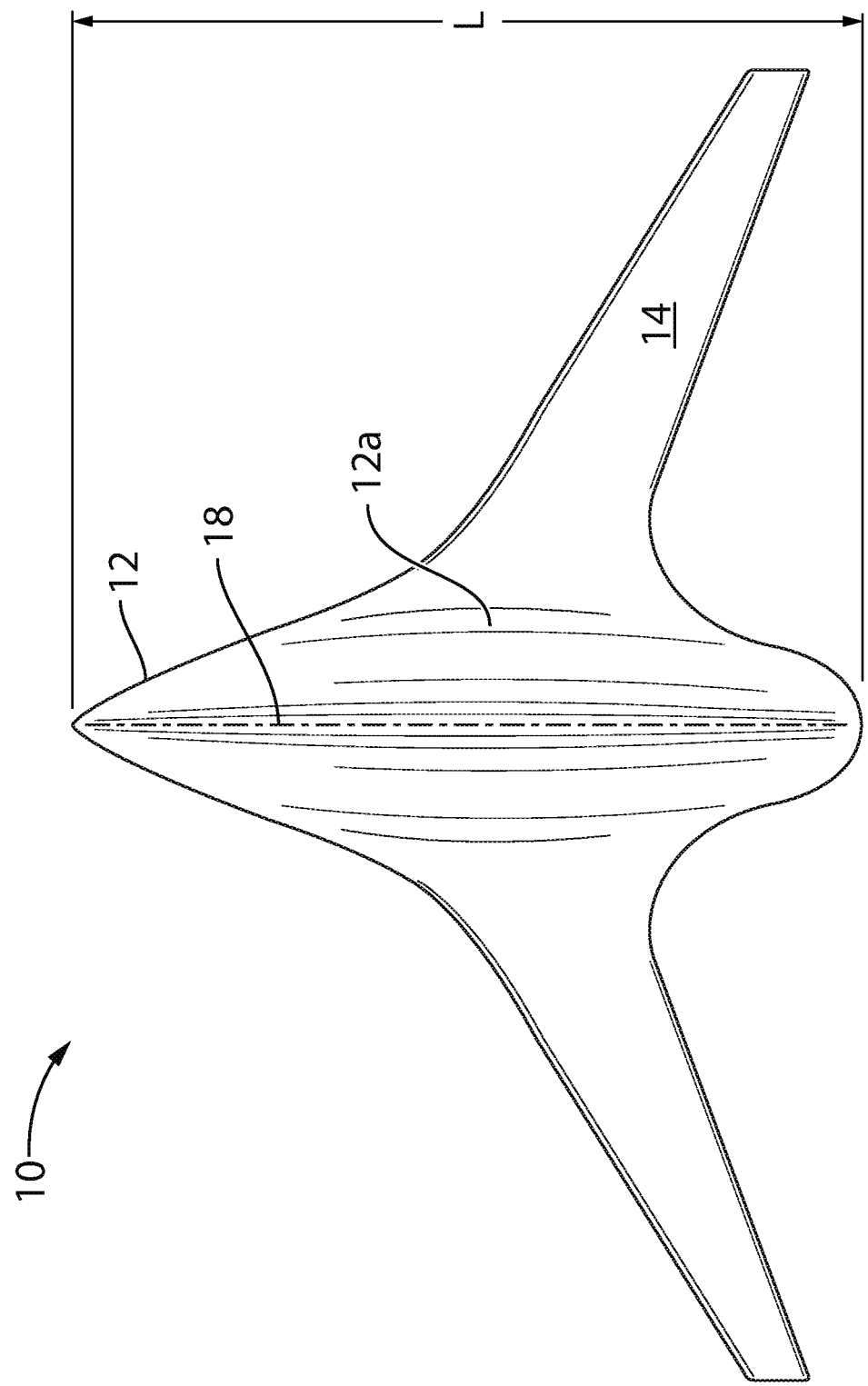
FIG. 2 is a schematic top view of the blended wing aircraft of FIG. 1 with engines of the aircraft omitted.
Figure 3:
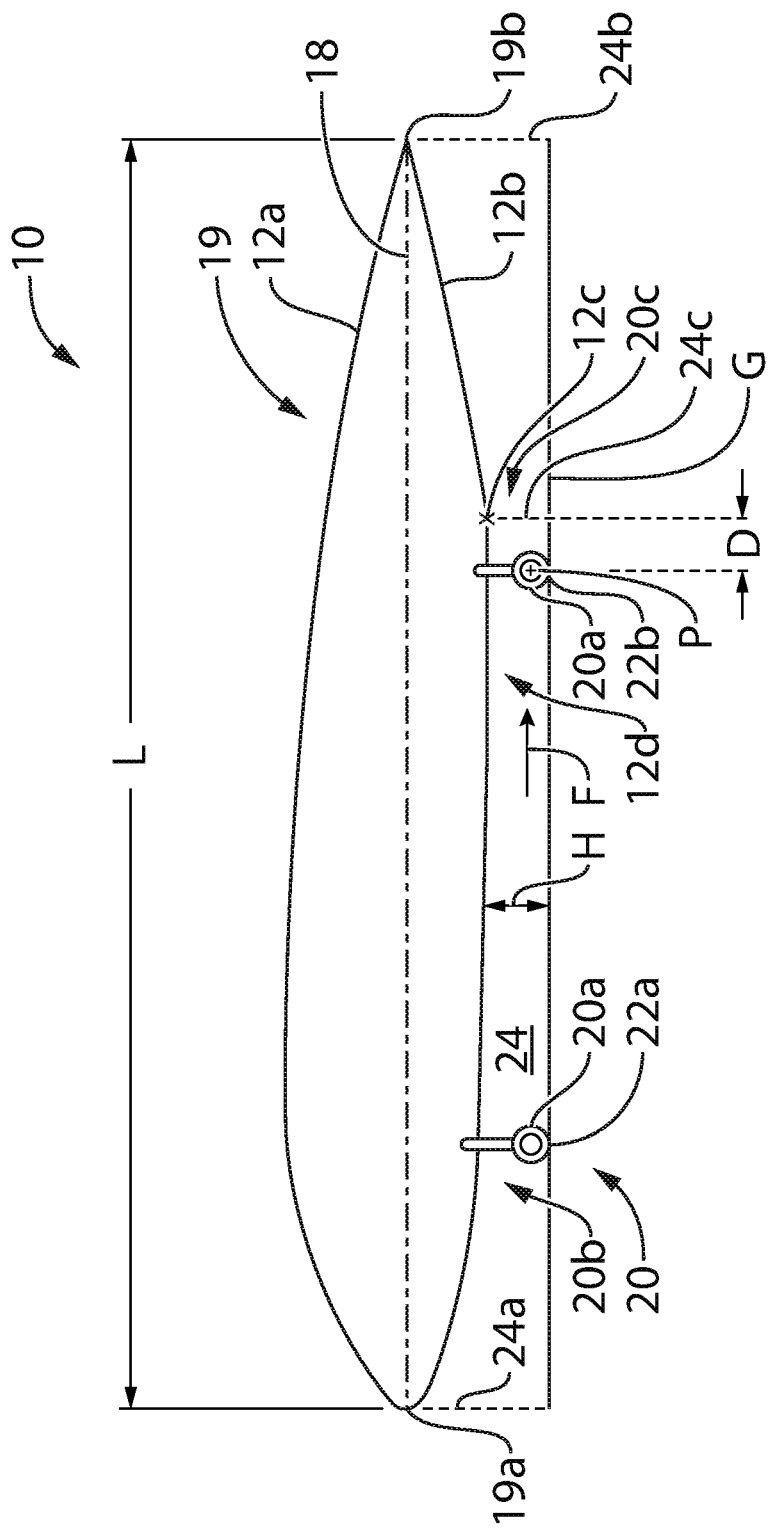
FIG. 3 is a cross-sectional view along a symmetry plane of the blended wing aircraft of FIG. 1.

Referring now to FIGS. 1-3, the airfoil-shaped center body 12 has an upper side 12a and a lower side 12b opposed to the upper side 12a. The center body 12 has a central chord 18 at a central section 19. The central section 19 is located at the symmetry plane of the aircraft 10 and extends longitudinally with respect to the center body 12. The central section 19 is shaped as an aerodynamic profile and has a chord length L that extends from a leading edge 19a to a trailing edge 19b of the center body 12. The central section 19 represents a profile of an outer skin of the aircraft 10 at the symmetry plane.

The aircraft 10 has one or more landing gears 20 mounted to the center body 12 or other part of the aircraft 10 and configured for supporting the aircraft 10 on a ground G. The landing gears 20 can be movable from a retracted position to a deployed position. In the retracted position, the landing gears 20 are concealed within the center body 12 such as to not disturb an air flow circulating around the aircraft 10. In the deployed position, the landing gears 20 protrude from the center body 12 to allow wheels 20a of the landing gears 20 to engage the ground G during take-off and landing of the aircraft 10. It is understood that the landing gears 20 may be fixed landing gears that are not retractable within the center body 12.

In the embodiment shown, the landing gears 20 include a nose landing gear 20b and a main landing gear 20c. The nose landing gear 20b is located adjacent the fore end of the center body 12 and the main landing gear 20c is located rearward of the nose landing gear 20b and between the nose landing gear 20b and the aft end of the aircraft 10. The main landing gear 20c is configured to support a major portion of a weight of the aircraft 10. The nose and main landing gears 20b, 20c define ground contact points 22a, 22b with the ground G when the BWB aircraft 10 is (e.g., at rest or taxiing) on the ground.

When the aircraft 10 is proceeding down a runway during take-off, the aircraft 10, using different systems, creates an overall nose-up pitching moment that tends to lift the fore end away from the ground G by inducing a rotation of the aircraft 10 about a pivot point P. The pivot point P can be representative of an axis of rotation of one of the wheels 22a of the main landing gear 20c. Pivot point P can be representative of a contact point between the aircraft 10 and the ground G. The pivot point P can be representative of an axial location of a contact point 22b between the main landing gear 20c and the ground G. The pivot point P may be located at an axial location of the main landing gear 20c along the central chord 18. When the main landing gear 20b includes a plurality of axles each having at least one wheel 20a mounted thereto, the pivot point P can be defined by a contact point between the at least one wheel 20a of one of the axles and the ground G. In the depicted embodiment, a location of the pivot point P ranges from 50% to 75% of the chord length L from the leading edge 19a of the central section 19. In a particular embodiment, the location of the pivot point P ranges from 55% to 70% of the chord length L from the leading edge 19a of the central section 19.

During rotation of the aircraft 10 during take-off, an angle of attack of the aircraft 10 increases and, consequently, a magnitude of a lifting force also increases. At some point, the nose landing gear 20b is lifted above the ground G while the main landing gear 20c is still in engagement with the ground G. While still in engagement with the ground G, the main landing gear 20b can define a fulcrum about which the aircraft 10 rotates to increase the angle of attack. At some point, the magnitude of the lifting force becomes greater than the weight of the aircraft 10 and the aircraft 10 is able to take-off and the main landing gear 20c can leave the ground G.

When the aircraft 10 is on the ground G and increasing its speed down the runway during take-off while both of the nose and main landing gears 20b, 20c are still in engagement with the ground G, a channel 24 is defined between the ground G and the lower side 12b of the center body 12. The lower side 12b of the center body 12 is convex and, therefore, the channel 24 is similar to a convergent-divergent channel having a height H that varies from an inlet 24a to an outlet 24b thereof. The height H of the channel 24 is minimal at a given location between the inlet 24a and the outlet 24b. The channel 24 defines a throat 24c at the given location wherein the height H is minimal. In other words, the lower side 12b of the center body 12, at the central section 19, has a lowest point 12c. The lowest point 12c is the point of the body lower side 12b that is closest to the ground G when the nose and main landing gears 20b, 20c are in engagement with the ground G (e.g., when the aircraft 10 is taxiing or is at rest). The location of the throat 24c between the central section leading and trailing edges 19a, 19b corresponds to that of the lowest point 12c.

During take-off, a flow of air F develops within the channel 24 and a suction zone is created at and downstream of the throat 24c relative to a direction of the flow of air F within the channel 24. This phenomenon is known as the Venturi effect. The suction zone creates a force that tends to move a section of the lower side 12b that spans the suction zone toward the ground G. Depending of its location relative to the pivot point P, this suction zone might create a moment about the pivot point P. More specifically, the force created by the suction zone on the section of the lower side 12b might create a pitching moment that might be either a nose-up or a nose-down pitching moment and that might contribute in either increasing or decreasing a magnitude of the overall nose-up pitching moment of the aircraft 10, respectively.

In the embodiment shown, locating the suction zone downstream or aft of the pivot point P might contribute in increasing the overall nose-up pitching moment of the aircraft 10 since the section that is located aft of the main landing gear 20c would be drawn toward the ground G. However, some locations of the suction zone might induce a nose-down pitching moment that will act against the overall nose-up pitching moment created by the aircraft 10 during take-off. Hence, when the suction zone decreases the overall nose-up pitching moment of the aircraft 10, take-off performance of the aircraft 10 might be affected. Hence, a length of a runway required for take-off might be longer than that of a configuration having the suction zone increasing the overall nose-up pitching moment. In some situations, the positioning of the lowest point 12c as disclosed herein may facilitate the operation of the aircraft 10 at some airports having shorter runways.

A distance D between the lowest point 12c and the pivot point P along the chord length L has an impact on a magnitude of a moment created by the suction zone about the pivot point P; the suction zone being created by the flow of air circulating within the channel 24 defined between the center body 12 and the ground G.

In the embodiment shown, the location of the lowest point 12c is located between a first location forward of the pivot point P and a second location aft of the pivot point P. The first location can be at a first distance corresponding to about 10% of the chord length L of the central chord 18 forward of the pivot point P. The second location can be at a second distance corresponding to about 5% of the chord length L of the central chord 18 aft of the pivot point P. In the embodiment shown, the lowest point 12c is located aft of the pivot point P. In a particular embodiment, the lowest point 12c is located at or within a distance corresponding to about 3% of the chord length L of the central chord 18 aft of the pivot point P. In a particular embodiment, the lowest point 12c is located at or within a distance corresponding to about 5% of the chord length L of the central chord 18 aft of the pivot point P. In a particular embodiment, the lowest point 12c is located at or within a distance corresponding to about 6% of the chord length L of the central chord 18 aft of the pivot point P. In a particular embodiment, the lowest point 12c is located at or within a distance corresponding to about 8% of the chord length L of the central chord 18 aft of the pivot point P. In a particular embodiment, the lowest point 12c is located at or within a distance corresponding to about 10% of the chord length L of the central chord 18 aft of the pivot point P. In a particular embodiment, the lowest point 12c is located at or within a distance corresponding to about 15% of the chord length L of the central chord 18 aft of the pivot point P.

In a particular embodiment, the second location is located anywhere aft of the pivot point P. In a particular embodiment, the second distance corresponds to about 15% of the chord length L aft of the pivot point P. In a particular embodiment, the second distance corresponds to about 10% of the chord length L aft of the pivot point P. In a particular embodiment, the second distance corresponds to about 8% of the chord length L aft of the pivot point P. In a particular embodiment, the second distance corresponds to about 6% of the chord length L aft of the pivot point P.

It is understood that the lowest point 12c may be located anywhere on the lower side 12b of the center body 12. In other words, the lowest point 12c may be located anywhere on the center body lower side 12b and along a span of the center body 12c. In a particular embodiment, the lowest point 12c is located at the central section 19.

In the depicted embodiment, the lower side 12b at the central section 19 has convex portion followed by a straight portion 12d disposed immediately forward of the pivot point. It is understood that the straight portion 12d may be replaced by a curved portion without departing from the scope of the present disclosure.

In a particular embodiment, having the lowest point 12c aft of the pivot point P can create a nose-up pitching moment about the pivot point P during take-off. A nose-up pitching moment is beneficial when the blended wing body is taking off. In a particular embodiment, a magnitude of the nose-up pitching moment increases as the lowest point 12c is moved further aft, toward the trailing edge 19b. In a particular embodiment, moving the lowest point 12c aft of the pivot point P has for effect of moving the maximum suction zone aft of the pivot point P. In a particular embodiment, having the lowest point 12c located aft of the pivot point P allows for creating a nose-up pitching moment without increasing a drag penalty compared to a conventional configuration. In a particular embodiment, having the lowest point 12c located aft of the pivot point P can reduce a speed the aircraft 10 is required to reach for taking off.

Figure 4:
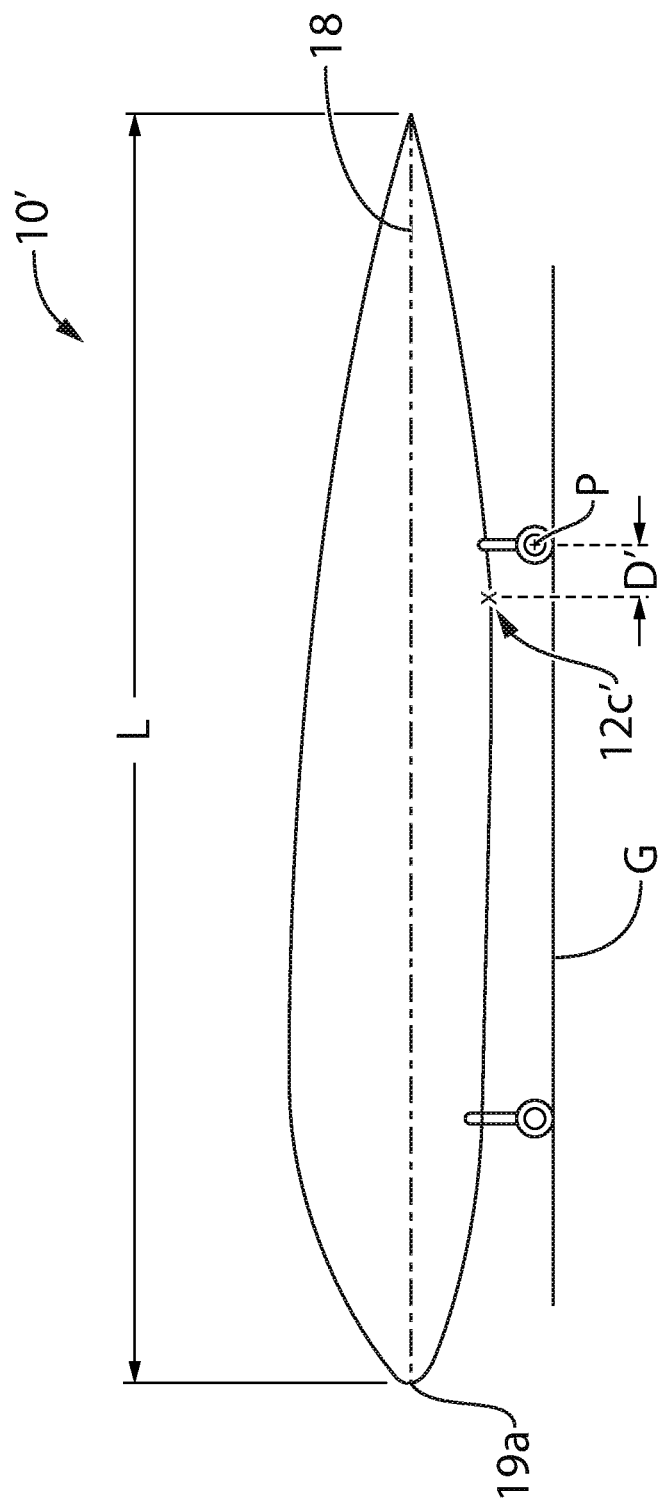
FIG. 4 is a cross-sectional view along a symmetry plane of a blended wing aircraft in accordance with another embodiment.

Referring now to FIG. 4, another BWB aircraft is shown at 10'. The position of the lowest point 12c' can be located forward of the pivot point P but still relatively close to the pivot point P so that any nose-down pitching moment that is induced during take-off may be less significant. In such a case, the distance D' between the lowest point 12c' and the pivot point P extends from the pivot point P to the lowest point 12c'.

In the depicted embodiment of FIG. 4, the lowest point 12c' is located forward of the pivot point P. In a particular embodiment, the lowest point 12c' is located at or within a distance corresponding to about 8% of the chord length forward of the pivot point P. In a particular embodiment, the lowest point 12c' is located at or within a distance corresponding to about 6% of the chord length L of the central chord 18 forward of the pivot point P. In a particular embodiment, the lowest point 12c' is located at or within a distance corresponding to about 4% of the chord length L of the central chord 18 forward of the pivot point P. In a particular embodiment, the lowest point 12c' is located at or within a distance corresponding to about 2% of the chord length L of the central chord 18 forward of the pivot point P. In some embodiments, the lowest point 12c' can be substantially axially aligned with the pivot point P in relation to central chord 18.

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A blended wing body aircraft comprising:
an airfoil-shaped center body having a lower side and an upper side opposed to the lower side, wherein:
the center body has a central chord extending from a leading edge of the center body to a trailing edge of the center body;
the lower side of the center body has a lowest point located between a first location forward of a pivot point about which the aircraft rotates during takeoff and a second location aft of the pivot point; and
engines mounted on top of an aft end of the center body;
wherein the lower side of the center body between a nose and main landing gear of the aircraft is convex, and upon procession of the aircraft down a runway during a takeoff and while both the nose and main landing gears are still in engagement with a ground, a channel is defined between the ground and the lower side of the center body, a height of the channel is minimal at a single location corresponding to said lowest point, said lowest point being lower than said pivot point, said channel defining a throat at said single location, said channel creating a suction zone downstream of the throat relative to a direction of air through the channel, said suction zone creating a nose up pitching moment about the pivot point, the first location being at a first distance corresponding to 4% of a length of the central chord forward of the pivot point and the second location is at a second distance corresponding to 5% of the length of the central chord aft of the pivot point.

2. The aircraft of claim 1, wherein the pivot point has an axial location along the central chord of a contact point between the aircraft and the ground.

3. The aircraft of claim 1, wherein the pivot point has an axial location along the central chord of a contact point between the main landing gear of the aircraft and the ground.

4. The aircraft of claim 1, wherein the pivot point has an axial location along the central chord of the main landing gear of the aircraft.

5. The aircraft of claim 1, wherein the lowest point is located within a distance corresponding to 3% of the length of the central chord aft of the pivot point.

6. The aircraft of claim 1, wherein the lowest point is located within a distance corresponding to 4% of the length of the central chord aft of the pivot point.

7. The aircraft of claim 1, wherein the lowest point is located within a distance corresponding to 2% of the length of the central chord aft of the pivot point.

8. The aircraft of claim 1, wherein the lowest point is located within a distance corresponding to 3% of the length of the central chord forward of the pivot point.

9. The aircraft of claim 1, wherein the lowest point is located within a distance corresponding to 2% of the length of the central chord forward of the pivot point.

10. The aircraft of claim 1, wherein the lowest point is located within a distance corresponding to 1% of the length of the central chord forward of the pivot point.

11. A blended wing body aircraft comprising:
an airfoil-shaped center body having a lower side and an upper side opposed to the lower side, the center body having a central chord extending from a leading edge of the center body to a trailing edge of the center body;
a nose landing gear and a main landing gear for supporting the aircraft on a ground, the main landing gear being located aft of the nose landing gear relative to the central chord, the main landing gear defining a pivot point about which the aircraft rotates during take-off, and
engines mounted on top of an aft end of the center body,
wherein a lowest point is located between a first location forward of the pivot point and a second location aft of the pivot point,
wherein the lower side of the center body between a nose and main landing gear of the aircraft is convex, and upon procession of the aircraft down a runway during a takeoff and while both the nose and main landing gears are still in engagement with a ground, a channel is defined between the ground and the lower side of the center body, a height of the channel is minimal at a single location corresponding to said lowest point, said lowest point being lower than said pivot point, said channel defining a throat at said single location, said channel creating a suction zone downstream of the throat relative to a direction of air through the channel, said suction zone creating a nose up pitching moment about the pivot point, the first location being at a first distance corresponding to 4% of a length of the central chord forward of the pivot point and the second location is at a second distance corresponding to 5% of the length of the central chord aft of the pivot point.

12. The aircraft of claim 11, wherein the pivot point has an axial location along the central chord of a contact point between the main landing gear of the aircraft and the ground.

* * * * *